3,455,865
STRIPPABLE POLYMERIC COATINGS
Robert O. Bolt, San Rafael, and William W. West, El Cerrito, Calif., assignors to Chevron Research Company, San Francisco, Calif., a corporation of Delaware
No Drawing. Filed Mar. 30, 1965, Ser. No. 444,076
Int. Cl. C08f 45/28; C09d 5/20
U.S. Cl. 260—33.6      14 Claims

ABSTRACT OF THE DISCLOSURE

Atactic, high molecular weight, high propene content, propene/butene copolymers to be used in solution for protective strippable coatings of cellulosic and other materials.

---

The invention concerns novel compositions useful in the formation of strippable coatings on a variety of materials. More particularly, the invention concerns novel compositions of high molecular weight hydrocarbon polymers which are useful for forming protective stirppable coatings on a variety of materials.

There are many situations in which materials are stored or used, when they are subjected to injurious conditions. Frequently, it is inconvenient to store large amounts of wood, metal, or paper in an enclosure to protect them from the deteriorating effects of the weather. Therefore, it becomes very desirable to have a coating material which can be readily coated onto a variety of base materials and provides a coat which affords protection from both the weather and abrasion and may then be easily removed without damaging the base material.

Pursuant to this invention, compositions are provided comprising novel high molecular weight copolymers of propene and butene which may be applied in the form of a solution in a vaporizable solvent to a variety of base materials to provide tough, moderately adherent coatings which may be readily removed without damage to the base material.

The polymers which find use are copolyers or propene and butene having molecular weights of at least about 100,000, predominantly atactic, and having from 65 to 95 mole percent propene and from 35 to 5 mole percent 1-butene. Small amounts of other monomers, e.g., ethylene may be present, but these will generally not exceed 10 mole percent. Preferably, the polymers have from 75 to 85 mole percent propene and from 25 to 15 mole percent 1-butene.

By predominantly atactic is meant soluble in refluxing heptane. That is, at least 50 weight percent of the polymer will dissolve in refluxing heptane. Preferably, at least 75 weight percent will be soluble in refluxing heptane and particularly preferred, 90 weight percent will be soluble in refluxing heptane. In determining the solubility, 10 parts of heptane will be used per part of polymer. Particularly preferred compositions are those which have at least 90 weight percent dissolved in heptane at 50° C. or below.

The molecular weight of the polymer will generally be at least 100,000 and not exceed 2,000,000. For the most part, the molecular weight will be in the range from about 250,000 to 1,000,000. The viscosity of the polymer reported in Saybolt Universal Seconds at 210° F. and determined at a concentration of 2.8 g. of polymer in 100 g. of 130 neutral oil will range from about 40 to 300, more usually about 60 to 175 SUS.

As already indicated, the polymers which find use in this invention are soluble in refluxing heptane. The polymers may be dissolved in aromatc hydrocarbon solvents, as well as aliphatic hydrocarbon solvents other than heptane. Illustrative solvents are benzene, toluene, heptane, hexane, octane, nonane, cyclohexane, etc. Usually, for convenience, mixed solvents will be used rather than a pure solvent. The solvents are not restricted to hydrocarbons, but also include halohydrocarbons, ethers, etc. The solvents generally have boiling points in the range of about 50° to 150° C. For the most part, aliphatic hydrocarbons are preferred of from about 6 to 9 carbon atoms, because of their availability and volatility. These solvents find use when applying the polymers of this invention to the base material.

Various additives may be used to further enhance properties which the compositions of this invention already have, e.g., adherence, strippability and weatherability, or to provide new protective properties to the film, e.g., fungicides, rust inhibitors, etc.

Additives which find particular use are those which protect the polymer from oxidative and ultraviolet light degradation. These additives include antioxidants and ultraviolet light absorbers. Illustrative antioxidants are substituted phenols, such as di-tert.-butyl-p-cresol, thio(bisphenols), etc., aromatic amines, organic phosphites, combinations of phenols and sulfur containing compounds, etc. Illustrative ultraviolet light absorbers are benzotriazole, hydroxyphenyl benzotriazole, hydroxy benzophenone, etc. These additives which protect against oxidative and ultraviolet light degradation will generally be present in from 0.01 to 2 weight percent of polymer.

Other additives are also included in the coating compositions as preferred embodiments. Such additives include fillers, such as talc, graphite, carbon black, asphaltenes, gilsonite, etc. Of particular advantage are graphite and carbon black, which also afford some ultraviolet protection. These additives will generally be present in from about 0.1 to 5 weight percent of polymer.

Other additives to enhance strippability include soaps, such as aluminum stearate, etc.

The total amount of the additives will usually be from about 0.1 to 10 weight percent of the polymer, more usually 1 to 5 weight percent of the polymer.

Plasticizers also find use, particularly hydrocarbons of lubricating viscosity. Preferred oils are those which are highly refined, e.g., white oil, turbine oil base-light, etc. Generally, the plasticizer will be present in from 1 to 30, preferably 5 to 25 weight percent of polymer.

The compositions of this invention are used as solutions or slurry-solutions in various solvents. Depending on the temperature, the concentration will be in the range of 5 to 50 weight percent, more usually in the range of about 10 to 30 weight percent. The solutions or slurry-solutions may be applied in a variety of ways, e.g., dip coating, spraying, roller coating, etc. Depending on the method of application, the temperature of application will vary from about 20° to 80° C. Any method which provides a relatively uniform coat on the base material or object may be employed. The use of the polymers of this invention, particularly at elevated temperatures, e.g., 50° C., provides relatively homogeneous solutions of relatively low viscosity, permitting the variety of methods of applying the polymers which have been described above.

The different methods of applying the coatings will affect the physical properties of the coating, e.g., adherence to the coated surface. To that extent, for some uses one method of applying will be preferred over another. It is found generally that the airless spray method (spray pattern formed by flow through orifice at 500–2000 p.s.i. pressure) at elevated temperature, e.g., 50° C., provides the best all around means of coating lumber stacks, e.g., stacks of plywood. Roller coating is useful for large areas, e.g., sheets of plywood. Dipping is preferred for odd shapes, including paper rolls, etc.

The coating application temperature affects the porosity of the coating, particularly as measured by water transmission. A cold application (see Table II) gives greater porosity than coating at elevated temperatures.

It is frequently advantageous to dry the coating at elevated temperatures. Depending on the solvent used, temperatures of about 125° to 175° F. will suffice over a period of 1 to 25 minutes; usually, 5 to 15 minutes is preferred. Warm air, heating lamp or other convenient means may be used to achieve the desired temperature. Usually, evaporation of only 85 to 95 weight percent of the solvent is required to obtain an acceptable nontacky surface.

The films which are applied to the base material or object will generally be of at least 0.001″ thickness and generally not more than 0.050″ thickness. More usually, the thickness of the film will be in the range of about 0.005 to 0.025″ thickness. The desired thickness will depend on the particular material used, the method of application, etc.

The films formed by this invention adhere to the various base materials sufficiently to provide the protection required from abrasion, water, etc. However, the films do not adhere so strongly that they deface the base material, such as wood or paper, when they are stripped from it. Therefore, the polymers of this invention adhere strongly enough so that they are not readily removed by accidental physical abuse, but are readily removed without damage to the base material when stripped. The cover must also be strong enough so the stripping is convenient. That is, when stripping, the coating must come off in large sheets and not crumble or stick to the base in small bits. The coatings of this invention are cleanly and easily removed from their base materials, coming off in large, continuous sheets.

The copolymers of this invention are readily prepared using "Ziegler" catalysts which do not provide high stereospecificity. Convenient catalysts are afforded by aluminum triisobutyl and titanium trichloride. The solvents used may be a variety of inert solvents, particularly inert hydrocarbon solvents, both aliphatic and aromatic. It is particularly advantageous to prepare the polymer in the solvent chosen for the final application, e.g., a mixture of hydrocarbons in the range of heptane through nonane. The temperatures of the reaction will generally be above room temperature, usually in the range of about 30° to 100° C. The pressure will generally be above atmospheric pressure, generally not exceeding 50 p.s.i.g. Control of the molecular weight of the polymer is most readily achieved by the use of a hydrogen pressure, when carrying out the polymerization. The methods for preparing these polymers are well known in the art and do not require extensive exemplification here.

The following examples ar offered by way of illustration and not by way of limitation.

EXAMPLE A

Into a reaction vessel, first purged with nitrogen, was introduced 35 gals. of an aliphatic solvent boiling in the range of 208° to 251° F., the solution heated to 170° F. and 225 g. of titanium trichloride "AA" and 255 g. of triisobutyl aluminum added. The vessel was then pressurized to 6 p.s.i.g. with hydrogen. A mixture of 12.3 lbs. of 1-butene and 37 lbs. of propylene was now slowly introduced into the reaction vessel while maintaining 22 p.s.i.g. total pressure. At the end of the reaction, the pressure dropped to 6 p.s.i.g. and the vessel was cooled to 130° F., the pressure vented and 1 liter of methanol added. The resulting mixture was stirred for 30 minutes and then 10 gals. of water added and stirred for an additional 30 minutes at 130° F. After allowing the two solutions to separate, the water layer was drawn off, the polymer solution treated again with 10 gals. of water, the water drawn off, and the polymer solution then isolated.

A large number of polymers was prepared having varying propene and butene mole ratios as well as differing molecular weights. The method used basically followed the method described in Example A. The following table lists the various polymers prepared and the conditions under which they were prepared. For a few polymers, some of their physical properties are reported.

TABLE I

| | Mole Ratio | | Monomers Charged, g. | Reaction Conditions | | | | | | | Visc., SUS at 210° F. | Mol. Wt.[3] $\overline{M}$ | |
|---|---|---|---|---|---|---|---|---|---|---|---|---|---|
| | | | | Time, Min. | Temp., °F. | Pressure, p.s.i.g. | | | Solvent [1] | Gal. | | | |
| Ex. | C₃ | C₄ | | | | N₂ | H₂ | M[2] | | | | Benzene | Isooctane |
| 1 | 75 | 25 | 2,290 | 270 | 170 | 10 | 0 | 5 | A | 7 | | | |
| 2 | 75 | 25 | 3,400 | 275 | 170 | 10 | 0 | 10 | Benzene | 7 | | 0.90 | 0.57 |
| 3 | 75 | 25 | 3,984 | 57 | 170 | 0 | 9.75 | 16.25 | Benzene | 7 | | 0.29 | 0.23 |
| 4 | 60 | 40 | 4,338 | 224 | 170 | 0 | 0 | 20 | B | 7 | 172 | 1.1 | 0.92 |
| 5 | 75 | 25 | 4,004 | 36 | 170 | 0 | 5 | 16 | A | 7 | | | |
| 6 | 80 | 20 | 4,480 | 90 | 170 | 0 | 9.75 | 16 | A | 7 | | | |
| 7 | 80 | 20 | 20,000 | 110 | 170 | 20 | 0 | 6 | A | 35 | | | |
| 8 | 90 | 10 | 20,000 | 300 | 170 | 0 | 6 | 16 | A | 35 | | | |
| 9 | 85 | 15 | 20,000 | 195 | 170 | 0 | 9 | 16 | A | 35 | | | |

[1] A=A largely aliphatic (94%) solvent with boiling range of 208–251° F. B=A largely aromatic (98%) solvent with boiling range of 268–280° F.
[2] M=Monomer.
[3] Determined by intrinsic viscosity measurements in the solvent indicated.

As already indicated, the coatings of this invention may be applied to protect a variety of materials: paper, wood, metals, e.g., aluminum and steel, glass, plastics, plasters, etc. It is with the soft absorbent surfaces of paper and wood that the coatings of this invention are particularly useful. It is these materials for which the properties of coatings are most stringent. The fine line between adhering to the surface without removing paper or wood when stripped sets strict limitations on the permitted coating materials. The materials of this invention have the proper balance of adherence, strength and strippability to provide excellent protection without damage to the protected base. The following data demonstrate the effectiveness of the coatings of this invention with the particularly sensitive material wood.

The polymers previously described were dissolved in a variety of solvents and applied to wood surfaces under a variety of conditions. The coatings were characterized under three categories: strippability, cleanliness, and film strength. Under each category, the films were arbitrarily evaluated from 1 to 10, 10 being the best results observed. Strippability or adhesiveness indicates the adherence to the wood and the ease with which the film strips from the wood. Cleanliness refers to small pieces adhering to the surface after removal of the coating. Film strength indicates the degree to which the film held together when it was stripped. The following table indicates the results obtained.

75 to 85 mole percent, said volatile solvent boils in the range of 50° to 150° C. and said additives comprise carbon black and benzotriazole.

4. An article comprising a base material and a protective film coating of from 0.001" to 0.05" thickness of a predominantly atactic copolymer of propene and 1-butene having 65 to 95 mole percent propene and of at least 100,000 molecular weight.

TABLE II

| Polymer [a] | | Approx. Polymer Conc.[e] weight percent | Plasticizer and Additive | Weight percent [b] | Film Thickness 0.001" | Method of Application [d] | Strippability | Film Strength | Cleanliness |
|---|---|---|---|---|---|---|---|---|---|
| 4/6 | 1:2 | 18 | | | | Dip (warm) | 6 | 8 | 9 |
| 2/6 | 2:1 | 19 | | | | do | 8 | 10 | 9 |
| 2/6 | 2:1 | 20 | Al stearate | 5 | | do | 8 | 10 | 9 |
| 2/6 | 1:1 | 20 | do | 5 | | do | 9 | 10 | 9 |
| 2/6 | 1:2 | 19 | | | | do | 8 | 9 | 9 |
| 5 | | 22 | Al stearate / 100 Pale Oil | 5 / 10 | 6–9 | do | 8–9 | 8 | 9 |
| 5 | | 20 | | | 8–12 | do | 8 | 9 | 9 |
| 5 | | 25 | Al stearate / 100 Pale Oil | 5 / 30 | 6–10 | do | 9 | 8–7 | 9 |
| 5 | | 21 | Al stearate | 5 | 6–10 | do | 8 | 9 | 9 |
| 5 | | 23 | 100 Pale Oil | 16 | 10–12 | Air Spray (warm) | 7 | 8 | 10 |
| 5 | | 23 | do | 16 | 16–19 | Dip (warm) | 6 | 8 | 9 |
| 5 | | 27 | 100 Pale Oil / Talc | 16 / 30 | 4–6 | do | 8 | 7 | 9 |
| 5 | | 27 | 100 Pale Oil / Talc | 16 / 30 | 11–18 | Air (warm) | 8–9 | 7 | 10 |
| 1 | | 16 | | | | Dip (warm) | 9 | 8 | 9 |
| 1 | | 19 | 100 Pale Oil | 20 | | do | 9 | 8 | 10 |
| 1 | | 22 | 100 Pale Oil / Talc | 20 / 30 | | do | 9+ | 7–6 | 8 |
| 5 | | 23 | PB–128 [c] | 20 | | do | 8 | 9 | 10 |
| 1 | | 19 | PB–128 | 20 | | do | 8 | 8–9 | 10 |
| 5 | | 20 | | | 11–15 | Airless spray (cold) | 6–7 | 9 | 8 |
| 5 | | 23 | 100 Pale Oil | 20 | 12–15 | do | 8–7 | 8 | 9 |
| 5 | | 22 | do | 10 | 15–23 | do | 8 | 7–8 | 9 |
| 9 | | 20 | | | 6–11 | Roller (warm) | 9–10 | 8 | 10 |
| 9 | | 20 | | | | Air Spray | 10 | 7 | 10 |
| 8 | | 16 | | | 4–6 | Roller (warm) | 9–10 | 7–8 | 10 |
| 7/8 | 1:1 | 16 | | | 8–10 | do | 10 | 9 | 10 |
| 7/8 | 3:1 | 16 | | | 5–7 | do | 9–10 | 9 | 10 |

[a] The first column indicates the particular polymer as described in Table I. The second column is the weight ratio.
[b] Weight percent based on solid polymer content.
[c] PB–128 = polyisobutylene of 2,700 molecular weight.
[d] Cold is room temperature to about 100° F., while warm is from about 130°–170° F.
[e] Includes plasticizer and additives.

It is evident from the above table that the compositions of this invention provide good adherent coatings which are readily stripped from the base material without injuring the material coated. The compositions may be applied by a variety of means to provide the necessary protection against abrasion, water, as well as other injurious conditions, while at the same time being readily removed when desired.

As will be evident to those skilled in the art, various modifications of this invention can be made or followed, in the light of the foregoing disclosure and discussion, without departing from the spirit or scope of the disclosure or from the scope of the following claims.

1. A composition useful for coating various materials to provide a protective coating against injury from weather or abrasion and which coat is readily stripped from the surface without injury to the surface, which comprises a predominantly atactic propene-(1-butene) copolymer of at least 100,000 molecular weight and not greater than 2,000,000 molecular weight, having from 65 to 95 mole percent propene, and being present in an amount of from 5 to 50 weight percent in a volatile hydrocarbon solvent and having from 0.1 to 10 weight percent of said copolymer of additives as fillers and for oxidative protection and from 1 to 30 weight percent of said copolymer of a hydrocarbon oil plasticizer.

2. A composition according to claim 1 wherein said polymer has a molecular weight in the range of 250,000 to 1,000,000, said propene is present in an amount of from 75 to 85 mole percent, said volatile solvent boils in the range of 50° to 150° C. and said additive comprises carbon black.

3. A composition according to claim 1 wherein said polymer has a molecular weight in the range of 250,000 to 1,000,000, said propene is present in an amount of from 5. An article according to claim 4 wherein said protective film coating is comprised of a predominantly atactic copolymer of propene-(1-butene) having 75 to 85 mole percent propene, and a molecular weight in the range of 250,000 to 1,000,000, from 0.1 to 10 weight percent of said copolymer of additives comprising fillers and agents to protect against oxidative degradation and from 1 to 30 weight percent of said copolymer of a hydrocarbon oil of lubricating viscosity.

6. An article according to claim 5 wherein said additive comprises carbon black.

7. An article according to claim 5 wherein said additives comprise carbon black and benzotriazole.

8. An article according to claim 5 wherein said additive comprises graphite.

9. A method of protecting a surface subject to injury from weather or abrasion which comprises applying to said surface a coating having an ultimate thickness of from 0.001" to 0.05" of a composition according to claim 1.

10. A method of protecting a surface subject to injury from weather or abrasion which comprises applying to said surface a coating having an ultimate thickness of from 0.001" to 0.05" of a composition according to claim 1.

11. A method of protecting a surface subject to injury from weather or abrasion which comprises applying to said surface a coating having an ultimate thickness of from 0.001" to 0.05" of a composition according to claim 1, wherein said coating is applied at a temperature in the range of about 100° to 200° F.

12. A method according to claim 11 wherein said coating is applied as an airless spray.

13. A method according to claim 11 wherein said coating is applied by dipping.

14. A method according to claim 11 wherein said coating is applied by roller coating.

References Cited

UNITED STATES PATENTS

| | | | |
|---|---|---|---|
| 2,875,076 | 2/1959 | Suchow | 106—307 X |
| 2,927,047 | 3/1960 | Schulde et al. | 260—33.6 |
| 2,928,756 | 3/1960 | Campbell | 260—33.6 |
| 3,132,027 | 5/1964 | Norton et al. | 260—94.9 |
| 3,145,111 | 8/1964 | Norton et al. | 260—33.6 |

ALLAN LIEBERMAN, Primary Examiner

J. H. DERRINGTON, Assistant Examiner

U.S. Cl. X.R.

117—6, 161; 260—41